US005275123A

United States Patent [19]

Geung

[11] Patent Number: 5,275,123

[45] Date of Patent: Jan. 4, 1994

[54] APPARATUS FOR AERATING AN AQUARIUM

[76] Inventor: Wilfred Wing-Ping Geung, No. 31, Lot 5, Hang Iau, Sheung Shul, New Territories, Hong Kong

[21] Appl. No.: 959,028

[22] Filed: Oct. 9, 1992

[30] Foreign Application Priority Data

Oct. 10, 1991 [GB] United Kingdom .............. 9121510.3

[51] Int. Cl.$^5$ .............................................. A01K 63/00

[52] U.S. Cl. .................................... 119/263; 119/226

[58] Field of Search ........................................ 119/5, 3

[56] References Cited

U.S. PATENT DOCUMENTS

| | | | |
|---|---|---|---|
| 2,133,740 | 10/1938 | Donohoue | 119/5 |
| 3,149,608 | 9/1964 | Murphy | 119/5 |
| 3,185,829 | 5/1965 | Rau | 119/5 |
| 3,326,183 | 6/1967 | Buchanan | 119/5 |
| 3,807,356 | 4/1974 | Pratt | 119/5 |
| 3,854,450 | 12/1974 | Puckett | 119/5 |
| 3,924,570 | 12/1975 | Lamonica | 119/5 |
| 4,117,805 | 10/1978 | Ward | 119/5 |
| 4,156,401 | 5/1979 | Ogui | 119/5 |
| 4,212,724 | 7/1980 | Moeglich . | |
| 4,388,192 | 6/1983 | Hellqvist . | |
| 4,606,821 | 8/1986 | D'Imperio | 119/5 |
| 4,863,594 | 9/1989 | Pedretti | 119/5 |

FOREIGN PATENT DOCUMENTS

| | | | |
|---|---|---|---|
| 2416365 | 10/1975 | Fed. Rep. of Germany | 119/5 |
| 190305 | 9/1907 | Switzerland | 119/5 |
| 1265690 | 3/1972 | United Kingdom . | |
| 2026291 | 2/1980 | United Kingdom . | |

OTHER PUBLICATIONS

"Aquarium Coffee Table and End Table", Fingerhut catalog, Apr. 9, 1991, p. 16.

*Primary Examiner*—Gene Mancene
*Assistant Examiner*—Todd E. Manahan
*Attorney, Agent, or Firm*—Wallenstein, Wagner & Hattis, Ltd.

[57] ABSTRACT

An aquarium comprises a container for holding a main body of water, a discrete region of the water being defined as a separate upright column. A submersible pump is positioned within the main body of water for drawing water from that main body and spraying the water onto the top of the discrete region, to aerate the water. An outlet at the base of the column provides circulation of the resulting aerated water down through the column and into the main body of water. The aquarium of the invention allows the surface of the main body of water to be substantially undisturbed thus allowing use of the aquarium as part of a coffee table, for example having a transparent top.

10 Claims, 2 Drawing Sheets

28 38 26 26 12 10 36 34 30 16 16 24 32 22 20 14 20 18 40

160
111
162
113
112
150
130
164
128
152
156
115
112
154
111
113
115
134
111
124
110

APPARATUS FOR AERATING AN AQUARIUM

FIELD OF THE INVENTION

This invention relates to an improved aquarium.

BACKGROUND TO THE INVENTION

In general the relatively compact type of aquarium which is used in a domestic environment has insufficient surface area to absorb enough oxygen to support a substantial number of fish. To overcome this problem, therefore, some form of aeration is required and this can be achieved by having an air pump which arranges to pump a continuous supply of air into the lower part of the aquarium so that a stream of air bubbles moves up through the water giving a good exchange of oxygen with the water. Alternatively a water pump can be provided which either sprays a jet of water onto the top surface of the water to create a ruffling of the surface and therefore improved aeration, or alternatively, by means of say a venturi effect, mixes air with a stream of water which is then ejected into the aquarium so as again to provide a stream of air bubbles.

Irrespective of the manner of aeration however, the result is that the top surface of the water is significantly disturbed. As a result it is not possible to see through the top surface clearly. This does not usually matter with traditional domestic aquaria since, generally speaking, it is intended that one views the interior of an aquarium through transparent side walls. Often the top is covered and contains equipment for aerating and filtering the water and illuminating the aquarium.

It is an object of the present invention however to enable an aquarium to be designed which can be seen through the top surface.

SUMMARY OF THE INVENTION

According to the invention in one aspect there is provided an aquarium which comprises a container for holding a main body of water, a discreet region of the water defined as a separate upright column, a submersible pump positioned within the main body of water for drawing water from that main body and spraying the water onto the top of said discrete region to aerate the water and outlet means at the base of the column to provide circulation of the resulting aerated water down through the column and into the main body of water.

Preferably, the pump passes the water through a filter means, e.g. a synthetic sponge.

When an aquarium is designed in this manner then there are no air bubbles passing through the main body of water to disturb the surface and equally the water which is being aerated is not sprayed on the top surface of the main body of water. That top surface can therefore be totally calm and is possible therefore to place the aquarium in a situation such that one can clearly view the aquarium contents through the top surface. Of course the top surface of the defined column of water is highly disturbed but that column can form a very small proportion of the overall top surface area and if desired can be hidden or masked at a side of the aquarium. Good aeration however can be given since vigorous spraying of the water is possible and the aerated water will circulate down the column and then will mix into the main body of water.

As is conventional with home aquaria the container for the body of water can, at its base, have a distribution system for re-circulated water and this distribution system can be covered with a bed of sand, eg coral sand, shingle and/or small stones to provide an even distribution of the recycled water throughout the whole body of the water. Also this bed cultures beneficial bacterial which converts the waste; such as excrement and urea to non-harmful nitrates.

To force the aerated water through the bed, a small head of water builds up in the column. As a result the aerated water circulates.

Because the top surface of the water in the aquarium is largely undisturbed it is possible to view the contents through that surface and so one can use such an aquarium as part of an attractive piece of furniture. Therefore accordingly to another aspect of the invention there is provided a coffee table or like piece of furniture, comprising a clear flat transparent sheet supported on legs, and provided beneath that transparent sheet an aquarium tank preferably with sufficient space beneath the tank for anyone sitting near the table to place their feet when they stretch their legs, the top surface of the body of water in the aquarium tank being largely unruffled by the means provided for aeration of the water in the tank. Preferably the aeration of the water is achieved in the separate upright column as described above.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
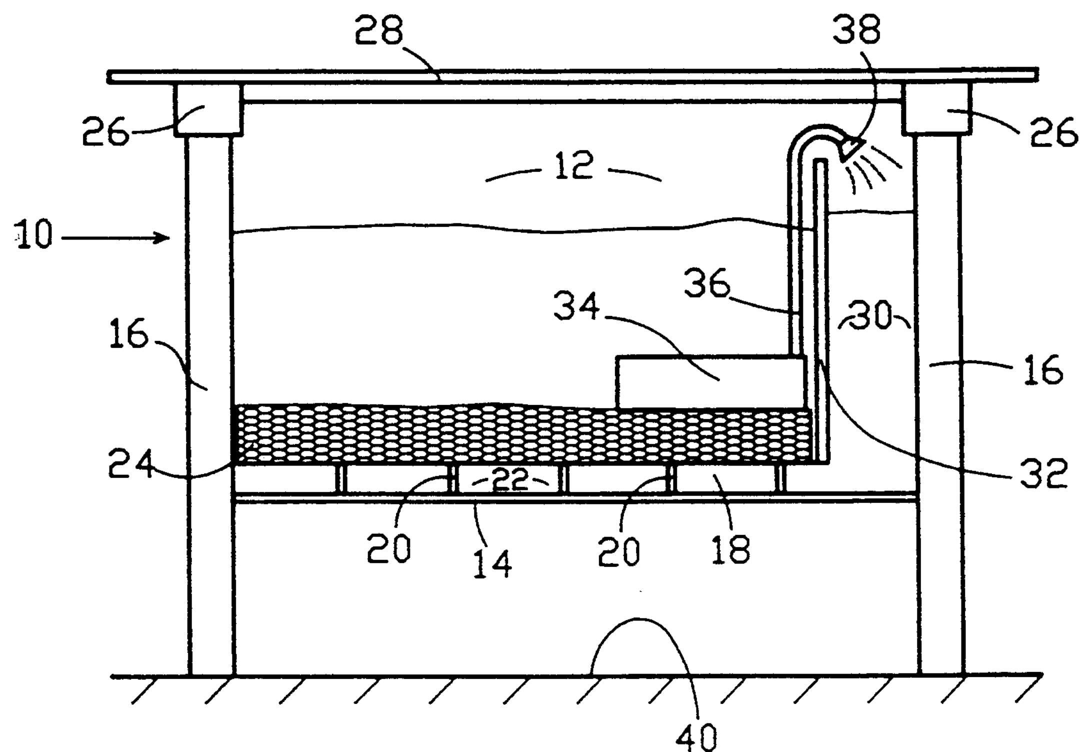
FIG. 1 is a side view of a combined aquarium and coffee table constructed according to a first aspect of the invention.

The aquarium 10 shown in the drawing comprises four flat upright side walls 12 and a base 14 which together define a substantially rectangular parallelepiped shaped aquarium. At the four corners, the side walls and base are joined to one another and to four upright legs 16. The side walls 12 are made of transparent material such as glass.

As is conventional in aquaria, the base 14 is covered with a distribution mat 18. This comprises a large number of individual pieces of plastics material matting having small holes through their upper surface and downwardly depending legs 20 which rest on the base 14. The individual pieces of matting are well known and so not shown in detail and designed to interlock with one another so that they can be joined to define the distribution mat 18 to fit the size of the aquarium. Underneath the mat 18 is defined a water passageway 22 from which water can pass upwardly through the holes in the individual pieces of matting.

Again as is conventional, the mat 18 is covered with a layer 24 of gravel, small stones and/or sand through which water from the passageway will permeate upwardly.

The tops of the legs 16 are provided with rubber buffers 26 and a transparent glass plate 28 rests on these over the aquarium to provide a table surface.

A separate column of water 30 is defined within the aquarium by an upright wall 32. In the example shown, this column 30 is positioned at one side of the aquarium. This is not essential and instead, for example, the column could say be positioned centrally and be defined by four upright walls or a round upright tube.

A conventional submersible electric water pump 34 is positioned within the aquarium and rests on the layer 24. It has an outlet pipe 36 leading to a spray nozzle or tube 38 positioned above the top of the column 30. The pump also includes a filter such as a piece of synthetic sponge, not shown. When operating therefore the pump 34 extracts water from the main body of water in the aquarium and directs a spray of water onto the top of the water in the column. Therefore there is a good aeration of the water by virtue of the spray and by the agitation of the top surface and the upper region of the water in the column.

It will be noted that the wall 32 abuts the top of the mat 18 and so the base of the column is in communication with the passageway 22. Therefore the aerated water is circulated down the column 30 and into the passageway 22. From there it permeates up through the layer 24 and so is evenly distributed into the main body of water in the aquarium. It will be noted that the head of water in the column is slightly above the level of the main body of water to promote this circulation.

Because the base 14 is raised clear of the floor 40 by legs 16, it is possible for someone to sit near the aquarium 10 which can, for example, be used as a coffee table. Also because the top surface of the main body of water is not disturbed by the aerating process, someone using the coffee table can look down into the aquarium and see fish and the like clearly through the glass plate 28.

If required the water in the column 30 can be additionally aerated by pumping a stream of air into the water at the base of the column 30, and the action of the air bubbles moving up through the column can be enhanced by providing illumination at the base of the column, either through a transparent base 14 or in the base of the column itself.

Figure 2:
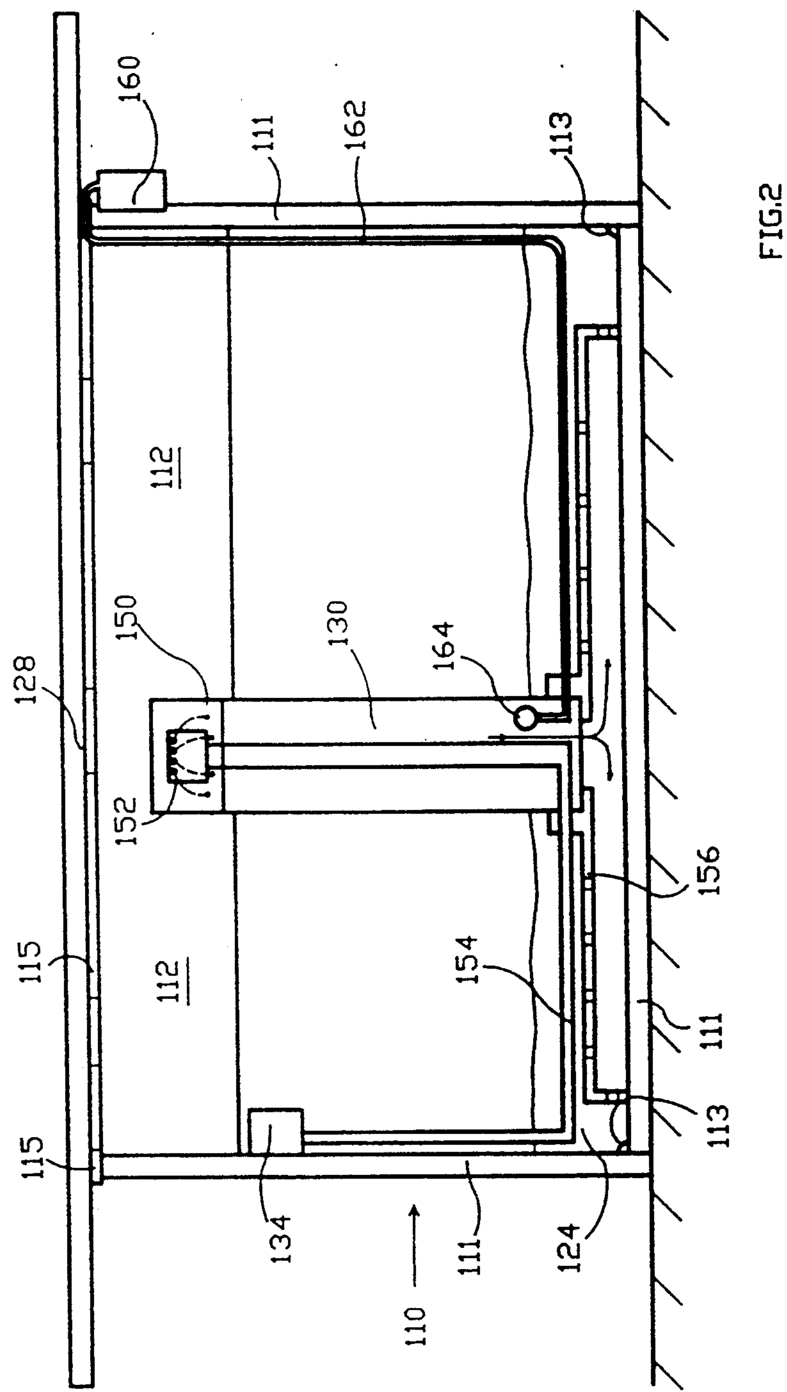
FIG. 2 is a side view of a combined aquarium and coffee table constructed according to a second aspect of the invention.

A second embodiment of the invention is shown in FIG. 2 which is a view similar to FIG. 1 and in which like elements are represented by like reference numerals with the addition of a hundred.

In FIG. 2, the upright wall 32 is replaced by a hollow cylinder 150 which is shown disposed centrally of the aquarium. Pump 134 is connected via pipes 154 to a radial sprinkler 152 disposed within cylinder 150. The cylinder 150 is mounted on an aeration plate or screen 156 which rests on the bottom of the aquarium hidden by the gravel layer 124. The aquarium is made from sheets of high strength glass, for example tempered glass sealed at each edge by a bead of silicone sealant 113. The table top 128 is supported directly by the aquarium via a rubber mounting member 115 which is provided with gaps 117 to allow air flow into the aquarium. This arrangement obviates the need for a separate supporting frame. The arrangement as shown in FIG. 2 provides a more aesthetically pleasing means of providing the water aeration means, with most of the pipe work being hidden in cylinder 150. A cylinder is shown open at both ends but may be closed at the top.

In certain circumstances, where a high degree of aeration is required, an air pump 160 may optionally be provided connected via pipework 162 to an air stone of conventional construction 164, the air stone being disposed within the cylinder 150.

The embodiments of the invention may advantageously be used in a gravel 24 (124) cleaning method in which a quantity of water from the aquarium is poured into the column/cylinder.

This creates an additional water head forcing the water through plate 156 and through the gravel 124 under higher pressure thus pushing sediment in the gravel layer into the aquarium water. The sediment containing water in the tank may than be replaced by clear water.

The aeration plate/screen is preferably formed from injection moulded plastics and includes a plurality of openings, e.g. 158 to allow water pumped into cylinder 150 to be returned to the main body of the aquarium.

The cylinder 150 may be decorated on its external surface if desired.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. An aquarium comprising a container for holding a main body of water, a discrete region of the water defined as a separate upright column having an open top, a submersible pump positioned within the main body of water for drawing water from that main body means associated with the pump for spraying the water on to said discrete region to aerate the water and outlet means at the base of the column to provide circulation of the resulting aerated water down through the column and into the main body of water.

2. An aquarium as claimed in claim 1 wherein the column is defined between an upright wall and a side wall of the aquarium.

3. An aquarium as claimed in claim 1 wherein the column is defined by an elongate hollow member disposed in the aquarium.

4. An aquarium as claimed in claim 3 wherein the hollow member is comprised by a hollow cylinder.

5. An aquarium as claimed in claim 1 wherein the outlet means comprises distribution means for distributing the aerated water over a substantial proportion of the base of the aquarium.

6. An aquarium as claimed in claim 5 wherein the distribution means comprises a distribution mat, plate or screen.

7. An aquarium as claimed in claim 1 further comprising an air pump connected to an air stone disposed in the column for additionally aerating the water therein.

8. The aquarium of claim 1, wherein the aquarium is a piece of furniture comprising a clear flat transparent sheet; means for supporting the sheet above ground level and said container located beneath the sheet said spraying of said water onto said discrete region being such that the top surface of said main body of water in the aquarium is largely undisturbed by said aeration.

9. The aquarium of claim 8, wherein said container is suspended above ground level by said support means.

10. The aquarium of claim 8, wherein said container provides said support means.

* * * * *